United States Patent
Vivian

[15] 3,670,036
[45] June 13, 1972

[54] STABILIZED METHYLENE CHLORIDE FOR HIGH TEMPERATURE APPLICATIONS

[72] Inventor: Thomas A. Vivian, Midland, Mich.
[73] Assignee: The Dow Chemical Company, Midland, Mich.
[22] Filed: Feb. 2, 1970
[21] Appl. No.: 8,037

[52] U.S. Cl. .................................................. 260/652.5 R
[51] Int. Cl. ..................................... C07c 17/42, C07c 17/40
[58] Field of Search ............................... 260/652.5; 252/171

[56] References Cited

UNITED STATES PATENTS

| | | | |
|---|---|---|---|
| 3,326,988 | 6/1967 | Stack | 260/652.5 |
| 3,326,989 | 6/1967 | Cormany et al. | 260/652.5 |
| 3,128,315 | 4/1964 | Hardies | 260/652.5 |

*Primary Examiner*—Howard T. Mars
*Attorney*—Griswold & Burdick, Herbert D. Knudsen and C. E. Rehberg

[57] ABSTRACT

Methylene chloride stabilized with 1–10 percent by weight of a nitroalkane, 0.1 to 5 percent by weight of an alkylene oxide and 0–10 percent of a dialkoxyalkane has been found to be especially good for high temperature applications even in continuous or intermittent contact with a reactive metal such as aluminum.

10 Claims, No Drawings

1

STABILIZED METHYLENE CHLORIDE FOR HIGH TEMPERATURE APPLICATIONS

BACKGROUND OF THE INVENTION

Many stabilized formulations of methylene chloride are known. Alkylene oxides, for example, have been used as an inhibitor to maintain a low HCl concentration.

Alkylene oxide inhibitors alone, however, do not provide sufficient protection for continuous or repetitive high temperature contact with metal. For example, when fresh methylene chloride stabilized with propylene oxide is contacted with used aluminum, the aluminum reacts with the methylene chloride at room temperature.

SUMMARY OF THE INVENTION

According to the present invention, it has now been found that methylene chloride stabilized with 1–10 percent by weight of a nitroalkane, 0.1 to 5 percent by weight of an alkylene oxide, and 0–10 percent by weight of a dialkoxyalkane is stable when used in high temperature applications in the presence of reactive metals. Moreover, it has also been found that this stability is retained over extended use and even during intermittent heating and cooling.

In the present invention, the stabilizers are added so that the methylene chloride does not react with metal to form the metal chloride. For example, methylene chloride reacts with aluminum to form aluminum chloride and carbon. When the methylene chloride is stabilized, however, the tendency towards reaction is diminished. Of course, in high temperature applications, the problems of stabilizer degradation and the increased tendency to react have made the stabilization of methylene chloride over long periods at high temperatures very difficult.

The stability of the methylene chloride in contact with metals is determined by comparative temperature analysis. The reaction of methylene chloride is exothermic and the difference of temperature in a sample of methylene chloride containing a metal coupon and the surrounding metal block can be utilized to determine whether an exotherm occurs. Thus, when an exotherm is noted, the stabilization of the methylene chloride has at least partially failed.

These two and optionally three component stabilizers have been found to be effective for methylene chloride to prevent or substantially reduce the exothermic reaction with metals. Also, these stabilized compositions of methylene chloride have been found to be effective for protecting metals by treating the metal with a composition of the invention at an elevated temperature.

The nitroalkane of the stabilizer as noted may comprise about 1 to about 10 percent by weight of the methylene chloride and may be any nitroalkane compatible with the methylene chloride. Preferred nitroalkanes have one to six carbon atoms, with nitromethane being especially preferred. In methylene chloride, concentrations of 3 to 8 percent by weight are preferred because of the advantageous stabilization realized and the good protection of the metal obtained.

The alkylene oxide used in the invention may suitably be those having from two to four carbon atoms such as ethylene oxide, propylene oxide, butylene oxide or other higher alkylene oxides, with propylene oxide being preferred. Although the concentration of the alkylene oxide may range from about 0.1 to about 5 percent or more by weight concentrations of 0.4 to 3 percent are preferred. Higher amounts are usually not required because the HCl concentrations are low unless there is very extended contact of the same stabilized methylene chloride with metal. In combination with the other stabilizers of the invention, the concentration of HCl even over very long periods never becomes significant enough to require more alkylene oxide.

The dialkoxyalkane of the invention may suitably be any dialkoxyalkane of up to about 20 carbon atoms, with dialkoxy methanes of less than 10 carbon atoms being preferred and dimethoxymethane being especially preferred. Representative examples of higher dialkoxymethanes include diethoxymethane, dipropoxymethane, dibutoxymethane and ethoxybutoxymethane, dipentoxymethane, and 1-t-butoxy-2-methoxyethane. The dialoxyalkane is an optional component but stabilized methylene chloride containing this component is preferred with those stabilized solvents containing about 2 percent to about 5 percent of the dialkoxyalkane being especially preferred because of the better stabilization of the methylene chloride at high temperatures.

Unstabilized methylene chloride attacks a wide variety of metals. Among these metals are zinc, iron and aluminum. Of special importance in industry is the stabilization of methylene chloride against attack on aluminum because of the widespread use of aluminum and the active reaction of this metal with unstabilized methylene chloride.

As pointed out above, the additives of the invention are not only good stabilizers for methylene chloride, but the final compositions are useful for protecting metals. This protection is accomplished by contacting the metal with a composition of the invention and heating the metal to a temperature above 150° C. for a short period time. This treatment provides an effective protective coating on the surface of the metal.

This phenomenon also has advantages when continuous contact of methylene chloride is maintained with metal. Initially, the metal may be treated with a methylene chloride containing relatively large amounts of the stabilizers specified. After the metal and stabilized methylene chloride have been in contact at high temperatures for a period of time the metal is sufficiently protected to the extent that further additions of methylene chloride to the system may contain substantially reduced amounts of stabilizers. Thus, by initial treatment of the metal with methylene chloride containing a high concentration of stabilizers, subsequent additions of methylene chloride may contain a lower stabilizer concentration. This treatment is especially useful when methylene chloride is continuously or intermittently flowing over a metal surface.

SPECIFIC EMBODIMENTS

Comparative Examples A and B and Examples 1 and 2

By differential thermal analysis, various stabilized methylene chloride compositions were tested. The tests were conducted by adding the stabilized methylene chloride and aluminum coupon to the capillary and then heating the capillary to a temperature of 400° C. unless an exotherm occurred prior to that temperature. After the exotherm or the attainment of 400° C., the capillary was cooled to room temperature, the stabilized methylene chloride was replaced with fresh solvent containing the same stabilizers and the heating was repeated using the same aluminum coupon. This cycle was repeated as many times as shown in Table I. The exotherms noted in that table show that at least partial failure of the stabilizer and is measured by the difference in the temperature of the capillary as compared to that of the surrounding block.

TABLE I.—STABILIZED METHYLENE CHLORIDE

| Example | Stabilizer, wt. percent | Temperature of exotherm, ° C | | |
|---|---|---|---|---|
| | | Run 1 | Run 2 | Run 3 |
| A | 0.5% propylene oxide | 205 | 25 | |
| B | 2.8% propylene oxide | 230 | 25 | |
| 1 | 0.5% propylene oxide, 3.2% nitromethane | None | 165 | 185 |
| 2 | 0.5% propylene oxide, 4.7% nitromethane | None | None | [1] None |

[1] No exotherm occurred on two subsequent solvent replacements and heating.

EXAMPLE 3

In the same manner as shown in the examples above, four runs were made with methylene chloride stabilized with by weight 0.5 percent propylene oxide, 4.6 percent nitromethane and 2.3 percent dimethoxymethane. In the first two runs, no exotherms were observed, in the third run, an exotherm was observed at 175° C. and in the fourth run, no exotherm was observed.

EXAMPLE 4

With stabilized methylene chloride of Example 3, one run was carried out without observing an exotherm. The capillary was cooled and the solvent was replaced by methylene chloride stabilized with 0.5 weight percent propylene oxide, the stabilized methylene chloride of Comparative Example A. Upon heating, only a mild exotherm was noted at 260° C. signifying a partial failure of the stabilization.

EXAMPLE 5

Stabilized methylene chloride containing by weight 0.5 percent propylene oxide, 7.4 percent nitromethane and 3.4 percent dimethoxymethane was run four times in the test of the examples above. In each of these four runs, no exotherms were observed. In a fifth run, methylene chloride stabilized with 0.5 percent propylene oxide, Comparative Example A, was used in the test and again no exotherm was observed even at 400° C.

In the same manner as shown above, methylene chloride may be stabilized with other alkylene oxides, such as ethylene oxide and butylene oxide, other nitroalkanes such as nitroethane, nitrobutane, nitrohexane and other dialkoxyalkanes such as diethoxymethane, 1-t- butoxy-2-methoxyethane and 1-methoxy-2-methoxypropane.

I claim:
1. A stabilized composition consisting of methylene chloride and by weight:
   1–10 percent of a nitroalkane having one to six carbon atoms,
   0.1–5 percent of an alkylene oxide having from two to four carbon atoms, and
   0–10 percent of a dialkoxyalkane having up to about 20 carbon atoms.
2. The methylene chloride of claim 1 containing nitromethane.
3. The methylene chloride of claim 1 containing 3 to 8 percent by weight of the nitroalkane.
4. The methylene chloride of claim 1 containing propylene oxide.
5. The methylene chloride of claim 1 containing 0.4 to 3 percent of the alkylene oxide.
6. The methylene chloride of claim 1 containing a dialkoxymethane of up to 10 carbon atoms.
7. The methylene chloride of claim 1 containing dimethoxymethane.
8. The methylene chloride of claim 1 containing 2 to 5 percent by weight of the dialkoxyalkane.
9. The methylene chloride of claim 1 containing nitromethane and propylene oxide.
10. The methylene chloride of claim 1 containing nitromethane, propylene oxide and dimethoxymethane.

* * * * *